Dec. 8, 1925.
C. C. STROUT
1,565,031
ELECTRICAL TRIP BRAKE OPERATING MECHANISM
Filed May 8, 1925     2 Sheets-Sheet 1
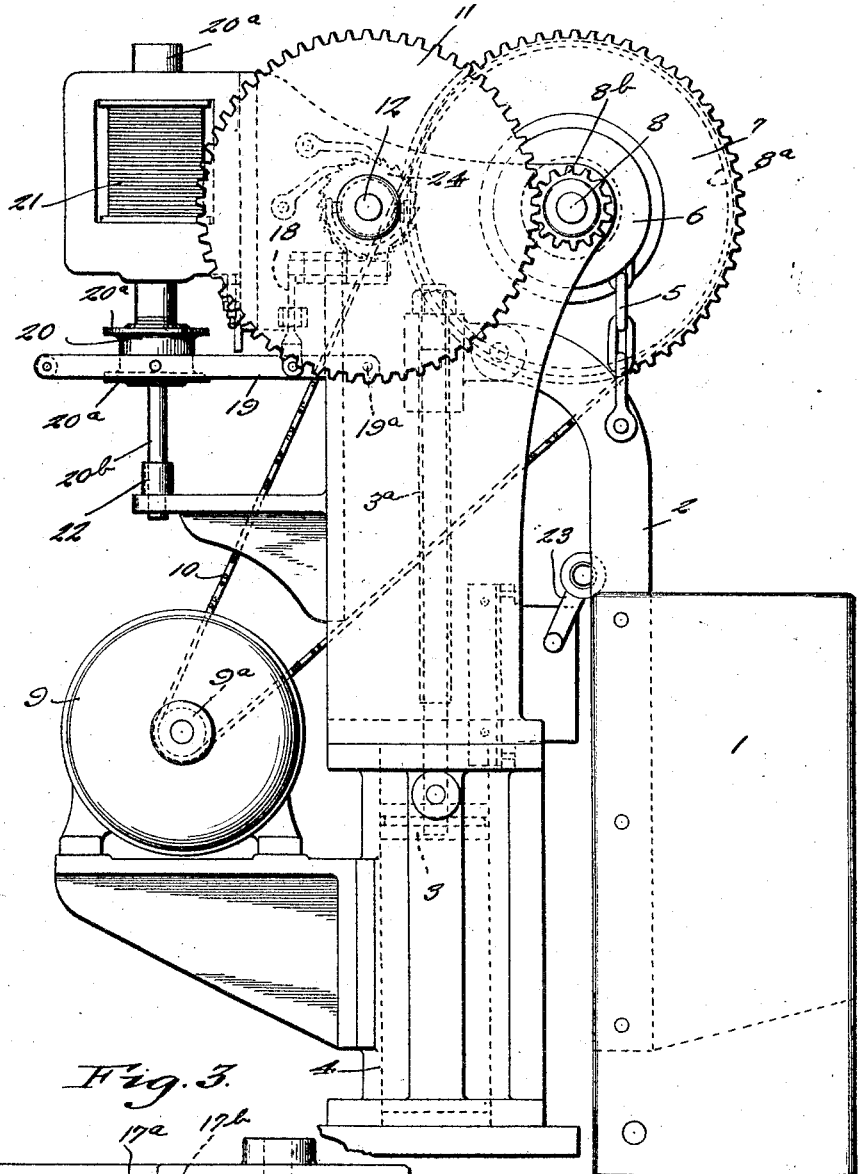
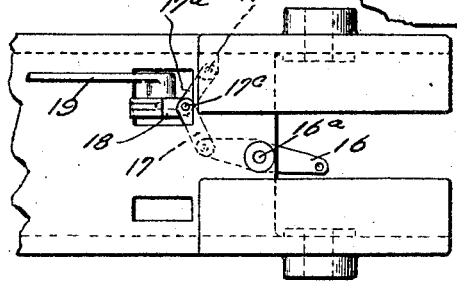
Inventor
Charles C Strout
By Spear Middleton Donaldson Hall
Attorney Dec. 8, 1925.                                              1,565,031
C. C. STROUT
ELECTRICAL TRIP BRAKE OPERATING MECHANISM
Filed May 8, 1925        2 Sheets-Sheet 2
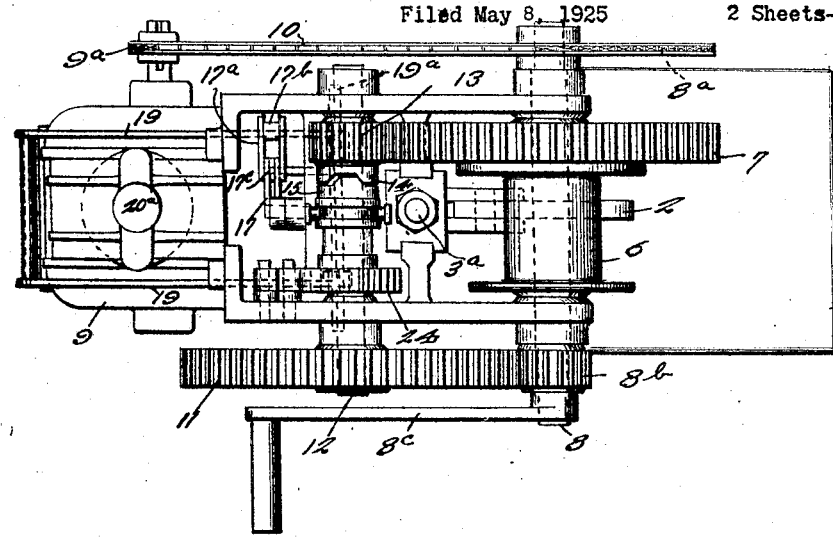
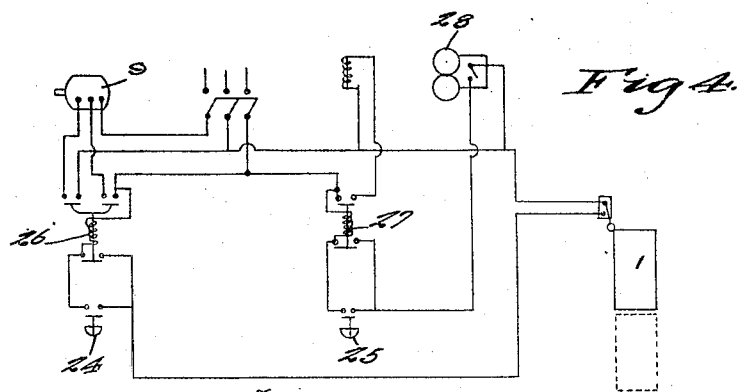
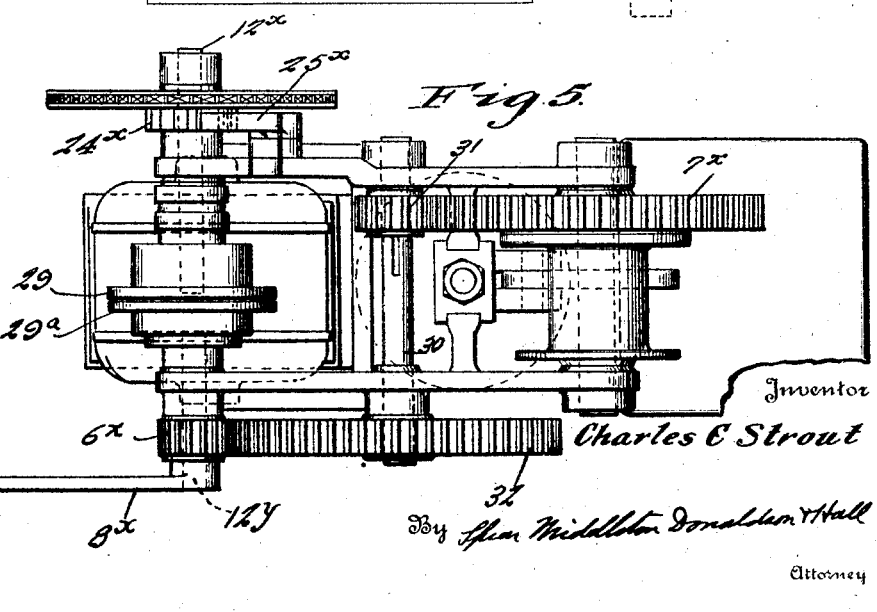
Inventor
Charles C. Strout Patented Dec. 8, 1925.

1,565,031

UNITED STATES PATENT OFFICE.

CHARLES C. STROUT, OF BANGOR, PENNSYLVANIA, ASSIGNOR TO S. FLORY MANUFACTURING CO., OF BANGOR, PENNSYLVANIA, A CORPORATION OF PENNSYLVANIA.

ELECTRICAL TRIP-BRAKE-OPERATING MECHANISM.

Application filed May 8, 1925. Serial No. 28,992.

To all whom it may concern:

Be it known that I, CHARLES C. STROUT, a citizen of the United States, and resident of Bangor, in the county of Northampton and State of Pennsylvania, have invented certain new and useful Improvements in Electrical Trip-Brake-Operating Mechanism, of which the following is a specification.

My present invention relates to improvements in devices or mechanism for operating the brakes of hoisting and like apparatus, which brakes are designed to come into action to prevent overwinding, over-speed, and the like.

The invention aims to provide a simple, economical, and efficient form of apparatus which will automatically release a brake actuating weight, and has other objects in view which will hereinafter appear.

The invention includes the novel construction hereinafter described, the nature and scope of my invention being defined and ascertained by the claims appended hereto.

In the accompanying drawings—

Figure 1 is a side elevation of an embodiment of my improved brake actuating device.

Fig. 2 is a plan view.

Fig. 3 is a detail view.

Fig. 4 is a diagrammatic view of the control circuits, and

Fig. 5 is a view of a modification.

Referring by reference characters to these drawings, the numeral 1 designates a brake operating weight which, in case of overspeed or over-wind or the like, is designed to be dropped and thereby to check the motion of the winding drum, through the action of the ordinary, or any desired brake mechanism, which is not shown herein as forming no part of the invention, it being obvious that the dropping of the weight could be caused to operate the brake through its engagement with a brake lever or any analogous device.

This weight is preferably provided with an arm 2, which is laterally offset or curved at its upper end and connected to the upper end of a piston rod $3^a$, the piston 3 of which works in a cylinder 4 filled with oil or other suitable liquid.

The cylinder and piston constitute a dash pot to regulate the descent of the weight, the flow of oil past the piston being regulated by an adjustable by-pass of any satisfactory construction and to which no claim is made.

For elevating the weight I provide a flexible element such as a chain 5 having one end conveniently secured to the bar 2, and the other end attached to a drum 6, which, together with its attached gear 7, is loose on a shaft 8 journaled in the main frame. Said shaft 8 is designed to be driven from the electric motor 9 through sprocket wheel $9^a$, sprocket chain 10 and sprocket wheel $8^a$ on shaft 8, this being intended to be representative of any desired form of driving connections. Drum shaft 8 carries fast thereon a gear $8^b$, and also a hand crank $8^c$ for hand winding when desired or necessary.

Gear $8^b$ meshes with a gear 11 fast on a counter shaft 12 journaled in the frame and parallel with the drum shaft, the countershaft having loose thereon a gear 13 meshing with gear 7. Gear 13 is provided with a clutch member 14 which cooperates with a complementary clutch member 15 splined on shaft 12 and provided with an annular groove which is engaged by the shifter fork of a lever 16 fulcrumed on a fixed pivot $16^a$. The rear end of this lever 16 (see Fig. 3) is connected by toggle links 17, $17^a$ with a fixed pivot $17^b$.

The intermediate pivot $17^c$ is connected by a link 18 to a lever 19, one end of which is articulated on fixed pivot $19^a$, while the other end is pivotally connected to a vertically moving electromagnetically actuated element 20. Preferably this is in the shape of a weight carried by the lower end of the moving core of a solenoid 21, the lever being forked to provide for pivoted engagement with opposite edges $20^a$ of the weight element, and the latter being further guided in a rectilinear path by depending rod $20^b$ engaging fixed guide 22.

The motor and solenoid coils being connected by suitable conductors to a source of current in the manner, for example, hereindescribed the motor is started to drive the gearing hereinfore described, and the solenoid being energized raises lever 19, which, through link 18, straightens the toggle 17, $17^a$, and causes the clutch lever to throw clutch member 15 into engagement with its companion member 14. This clutches gear 13 to the shaft, whereupon the motor operates the drum to wind up the cable and raise the brake operating weight 1.

When the weight reaches, or nears, the limit of its upward movement, it operates a lever 23 designed to open the motor circuit, and stop the motor, it being understood that the solenoid circuit is undisturbed and is designed to be left closed and the solenoid energized until broken by the over-wind or over-speed devices, or by failure of current.

Shaft 12 is provided with a ratchet wheel 24 energized by one or more pawls pivoted on fixed pivots which prevent reverse movement of the shaft and descent of the weight when the motor circuit is open. The parts are now set in brake operating position, which will be maintained as long as the solenoid is energized. Failure of current in the solenoid coils will, however, allow the core and weight to descend, depressing lever 19 and breaking the toggle, with resulting disengagement of the clutch member 15 from the member 14 on the gear 13. This will leave gear 13 free to rotate on shaft 12 and as drum and gear 7 are loose on shaft 8, the drum will be free to rotate to allow the chain to unwind and the weight to drop and operate the brake. It will be observed that with the parts set in the position of Fig. 1, the upper flange 20$^a$ is spaced from the fork. This allows the weighted solenoid core, when dropped, to act with a hammer action, facilitating or insuring the breaking of the toggle.

I have shown in Fig. 4 a diagrammatic arrangement of circuits or hook-up, suitable for operating the aforesaid mechanism in which press buttons 24 and 25 are provided for actuating magnetic contactors 26 and 27 respectively, which in turn close the motor and solenoid circuits, the overwind and overspeed circuit controlling device being shown conventionally at 28 as the same forms, per se, no part of the present invention. As this view will be readily understood by those accustomed to the reading of such hook-ups, further description is deemed unnecessary. It will be understood that the magnetic contactors or circuit closers 26 and 27 are of the type that are electrically operated by the push buttons and are held in circuit closing position by magnetic action until the motor and solenoid circuits respectively are broken.

It is obvious that various changes might be made in the details of construction, without departing from the spirit of my invention. For example, the particular electro-magnetically operated clutch might assume various forms, and a specific example of a modification thereof, especially adapted for use when D. C. current is available, is shown in Fig. 5, in which the motor is designed to be coupled to the drum by the electro-magnetic clutch 29—29$^a$, rendered effective by the passage of the direct current. In this case, I prefer to interpose a second countershaft 30 between the drum shaft and clutch bearing shaft, and a double set of reduction gears, as indicated at 7$^x$, 31, 32 and 6$^x$ respectively.

It will be understood that the magnetic clutch members 29—29$^a$ are carried by two independent axially aligned shaft members 12$^x$ and 12$^y$ respectively; the former to be driven from the motor by a chain and sprocket drive, and being held against reverse movement on opening of motor circuit, by pawl 25$^x$ engaging ratchet wheel 24$^x$, and the latter being geared to the drum shaft by the reduction gearing referred to. In this case the crank for hand winding may be conveniently applied to shaft member 12$^y$ as indicated at 8$^x$.

Having thus described my invention, what I claim is:—

1. Brake operating mechanism of the class described, comprising a drum, a weighted member adapted when released to operate a brake, means for raising said weight, motor means normally disconnected therefrom for operating said weight raising means, and electrically controlled means for operatively connecting said motor means with said drum.

2. Brake operating mechanism of the class described, comprising a drum, a weighted member adapted when released to operate a brake, means for raising said weight, motor means normally disconnected therefrom for operating said weight raising means, electrically controlled means for operatively connecting said motor means with said drum, and means for automatically stopping the motor means when the weight means reaches a predetermined elevation.

3. In combination, a winding drum, a weighted member having a flexible element attached to said drum, an electric motor, and driving means between said motor and drum, including a releasable electrically operated clutch device.

4. In combination, a winding drum, a weighted member having a flexible element connecting it with said drum, an electric motor, driving means for connecting said motor to said drum, said driving means including a clutch device, and electric controlling means for said clutch whereby it is maintained in clutching position so long only as current is maintained in said electric controlling means.

5. In combination, a winding drum, a weighted brake operating element having a flexible connection with said drum, to be wound thereon, an electric motor, driving means in connection with said motor, said driving means including electro-magnetically operated clutching means operative to connect the motor to the drum only when energized, a clutch controlling circuit including manually operated circuit closing and automatic circuit opening means, a motor circuit including a manually operated circuit closing device, and a circuit opening device with means whereby it is automatically operated and the motor stopped when the flexible element is wound on the drum.

6. In combination, a winding drum, a weighted brake operating element having a flexible connection with said drum, to be wound thereon, an electric motor, driving means for said motor, said driving means including electro-magnetically operated clutching means operative to connect the motor to the drum only when energized, a clutch controlling circuit including manually operated circuit closing and automatic circuit opening means, a motor circuit including a manually operated circuit closing device, and a circuit opening device with means whereby it is automatically operated and the motor stopped when the flexible element is wound on the drum, and means for preventing reverse movement of the drum when the motor circuit is opened.

7. In combination, a winding drum, a weighted member, a flexible element connecting said member to the drum, an electric motor for driving said drum, operating connections between said motor and drum including a clutch, a controlling circuit for said motor, means for preventing reverse movement of the drum when the motor circuit is broken, means for automatically breaking said circuit when the flexible element is wound on the drum, an electro-magnetic device for operating said clutch to connect the motor drive when energized, and a circuit for energizing said electro-magnetic means, including a source of current, and an automatic circuit breaker.

8. In combination, a winding drum, a weighted member, a flexible element connecting said member to the drum, an electric motor for driving said drum, operating connections between said motor and drum, including a clutch, a controlling circuit for said motor, means for preventing reverse movement of the drum when the motor circuit is broken, means for automatically breaking said circuit when the flexible element is wound on the drum, a toggle mechanism for operating said clutch, electro-magnetic means for operating said toggle mechanism, and a circuit for said electro-magnetic means, including a source of electric supply and an automatic circuit breaker.

9. Brake operating mechanism of the class described, comprising a weighted member adapted when released to operate a brake, means for raising said weight, motor means normally disconnected therefrom for operating said weight raising means, electrically controlled means for operatively connecting said motor means with said drum, and a dash pot for regulating the descent of said weighted member.

10. In combination, a winding drum, a weighted member, a flexible element connecting said member to the drum, an electric motor for driving said drum, operating connections between said motor and drum, including a clutch, a controlling circuit for said motor, means for preventing reverse movement of the drum when the motor circuit is broken, means for automatically breaking said circuit when the flexible element is wound on the drum, a toggle mechanism for operating said clutch, electro-magnetic means for operating said toggle mechanism, and a circuit for said electro-magnetic means, including a source of electric supply and an automatic circuit breaker, said toggle operating means including an operating lever and a weighted element having a lost motion connection therewith, whereby said weighted element acts with a hammer action to break the toggle.

In testimony whereof, I affix my signature.

CHARLES C. STROUT.